US008485143B2

(12) United States Patent
Honzen et al.

(10) Patent No.: US 8,485,143 B2
(45) Date of Patent: Jul. 16, 2013

(54) VALVE ARRANGEMENT FOR VENTING A COOLANT CIRCUIT OF AN INTERNAL COMBUSTION ENGINE

(75) Inventors: Matthias Honzen, Ludwigsburg (DE); Sebastian Riedl, Neckarsulm (DE); Christoph Anton, Leingarten (DE)

(73) Assignee: Audi AG, Ingolstadt (DE)

( * ) Notice: Subject to any disclaimer, the term of this patent is extended or adjusted under 35 U.S.C. 154(b) by 269 days.

(21) Appl. No.: 13/092,592

(22) Filed: Apr. 22, 2011

(65) Prior Publication Data

US 2012/0097364 A1 Apr. 26, 2012

(30) Foreign Application Priority Data

Apr. 24, 2010 (DE) .......................... 10 2010 018 089

(51) Int. Cl.
| | |
|---|---|
| F01P 7/14 | (2006.01) |
| F01P 9/04 | (2006.01) |
| F01P 1/06 | (2006.01) |
| F01P 3/22 | (2006.01) |
| F02F 1/10 | (2006.01) |
| F02B 75/18 | (2006.01) |
| F16K 24/04 | (2006.01) |

(52) U.S. Cl.
USPC ............... 123/41.54; 123/41.08; 123/41.3; 123/41.31; 123/41.72; 123/41.82 R; 123/41.29; 137/197; 137/199; 137/202

(58) Field of Classification Search
USPC ............ 123/41.08–41.1, 41.28, 41.29, 41.31, 123/41.72, 41.74, 41.82 R, 41.54; 137/197, 137/198, 202
See application file for complete search history.

(56) References Cited

U.S. PATENT DOCUMENTS

| | | | | |
|---|---|---|---|---|
| 2,147,993 | A * | 2/1939 | Scheibe | 96/210 |
| 3,363,642 | A * | 1/1968 | Grayson | 137/399 |
| 4,052,965 | A * | 10/1977 | Morris | 123/41.05 |
| 4,273,081 | A * | 6/1981 | Cleveland et al. | 123/41.08 |
| 4,300,718 | A | 11/1981 | Beyer | |
| 4,352,342 | A * | 10/1982 | Cser et al. | 123/41.54 |
| 4,425,937 | A * | 1/1984 | Stein | 137/480 |
| 4,510,893 | A * | 4/1985 | Schweiger et al. | 123/41.02 |
| 4,632,178 | A * | 12/1986 | Hirano | 165/299 |
| 5,111,776 | A * | 5/1992 | Matsushiro et al. | 123/41.54 |
| 5,287,590 | A * | 2/1994 | Yonkers et al. | 15/321 |
| 5,749,515 | A | 5/1998 | Duprez | |
| 5,836,269 | A | 11/1998 | Schneider | |
| 6,125,800 | A * | 10/2000 | Lugs | 123/41.54 |
| 6,379,201 | B1 * | 4/2002 | Biggs et al. | 440/88 R |

(Continued)

FOREIGN PATENT DOCUMENTS

| | | |
|---|---|---|
| DE | 29 47 984 A1 | 6/1980 |
| DE | 689 09 897 T2 | 6/1990 |

(Continued)

*Primary Examiner* — Lindsay Low
*Assistant Examiner* — Tea Holbrook
(74) *Attorney, Agent, or Firm* — Henry M. Feiereisen LLC

(57) ABSTRACT

A valve arrangement for venting a coolant circuit of an internal combustion engine having several subcircuits includes a valve which is in fluid communication with a primary vent line extending from one of the subcircuits. At least one secondary vent line is in fluid communication with the valve and extends from another one of the subcircuits. The primary and secondary vent lines are connectable to a shared third vent line which feeds into a compensating reservoir arranged at a geodetically highest point in the coolant circuit. The valve is constructed to establish a continuous fluid communication of the primary vent line with the compensating reservoir via the third vent line and to establish a fluid communication of the secondary vent line with the compensating reservoir via the third vent line only in the presence of air bubbles in the secondary vent line.

11 Claims, 2 Drawing Sheets

U.S. PATENT DOCUMENTS

| | | |
|---|---|---|
| 7,395,787 B1 | 7/2008 | Claypole et al. |
| 2003/0029167 A1* | 2/2003 | Hudson et al. .................. 60/598 |
| 2003/0106673 A1* | 6/2003 | Ly et al. ........................ 165/132 |
| 2005/0045119 A1* | 3/2005 | Miyagawa et al. .......... 123/41.1 |
| 2006/0000508 A1* | 1/2006 | Delaire et al. ........... 137/247.35 |
| 2010/0012561 A1* | 1/2010 | Clappison .................... 210/133 |

FOREIGN PATENT DOCUMENTS

| | | |
|---|---|---|
| DE | 40 36 365 A1 | 5/1992 |
| DE | 196 07 638 C1 | 6/1997 |
| DE | 698 37 532 T2 | 8/1998 |
| DE | 198 54 544 A1 | 6/2000 |
| DE | 199 12 138 A1 | 9/2000 |
| DE | 199 56 893 A1 | 5/2001 |
| DE | 101 39 314 A1 | 3/2003 |
| DE | 102005008669 | 8/2006 |
| DE | 102008008132 | 9/2008 |
| EP | 0 374 038 A1 | 6/1990 |
| JP | 10-266856 | 6/1998 |

* cited by examiner

VALVE ARRANGEMENT FOR VENTING A COOLANT CIRCUIT OF AN INTERNAL COMBUSTION ENGINE

CROSS-REFERENCES TO RELATED APPLICATIONS

This application claims the priority of German Patent Application, Serial No. 10 2010 018 089.0-13, filed Apr. 24, 2010, pursuant to 35 U.S.C. 119(a)-(d), the content of which is incorporated herein by reference in its entirety as if fully set forth herein.

BACKGROUND OF THE INVENTION

The present invention relates to a valve arrangement for venting a coolant circuit of an internal combustion engine.

The following discussion of related art is provided to assist the reader in understanding the advantages of the invention, and is not to be construed as an admission that this related art is prior art to this invention.

Valve arrangements of a type involved here are typically used in the automobile industry to separate unwanted air bubbles from a coolant. These air bubbles can form in the coolant of the coolant circuit as a result of heat generated during operation of an internal combustion engine and can cause damage to structural parts and/or can adversely affect the cooling capacity. To address this problem, it has been proposed to provide the coolant circuit with vent lines which are connected to a compensating reservoir. As the compensating reservoir is filled only partly with coolant, rising air can be collected in the reservoir in addition to coolant.

It would be desirable and advantageous to provide an improved valve arrangement for venting a coolant circuit to obviate prior art shortcomings and to allow a venting of several subcircuits of the coolant circuit separately from one another in a common compensating reservoir.

SUMMARY OF THE INVENTION

According to one aspect of the present invention, a valve arrangement for venting a coolant circuit of an internal combustion engine having several subcircuits includes a valve, a primary vent line in fluid communication with the valve and extending from one of the subcircuits, at least one secondary vent line in fluid communication with the valve and extending from another one of the subcircuits, and a shared third vent line connected to a compensating reservoir which is arranged at a geodetically highest point in the coolant circuit, the valve being constructed to establish a continuous fluid communication of the primary vent line with the compensating reservoir via the third vent line and to establish a fluid communication of the secondary vent line with the compensating reservoir via the third vent line only in the presence of air bubbles in the secondary vent line.

The present invention resolves prior art problems by connecting at least two vent lines (primary and secondary vent lines) from different subcircuits via a valve to a shared (third) vent line which feeds into the compensating reservoir. As a result, the line length to be installed can be reduced and the configuration of the compensating reservoir can be kept simple. As the valve separates the primary and secondary vent lines during operation, no mixing of coolant from different subcircuits takes place. This is advantageous in a situation when subcircuits are intended to be operated independently from one another at different temperature levels. Thus, as coolant from different subcircuits is normally not mixed, several subcircuits of the coolant circuit can be vented independently from one another in a common compensating reservoir. This has the benefit that there is no coolant flow in one or more of the subcircuits, for example during a warm-up phase of the internal combustion engine, so that the coolant can heat up more rapidly. The primary vent line may hereby constantly vent into the compensating reservoir, whereas the secondary vent line vents via the shared third line into the compensating reservoir only when rising air bubbles cause the valve to open and thereby establish a connection to the shared third line. When the air bubbles disappear from the secondary vent line, the valve closes again and the connection between the secondary vent line and the third vent line is cut. If need be, it is, of course, also possible to connect to the valve several secondary vent lines which again connect to the shared third vent line only in the presence of rising air bubbles.

According to another advantageous feature of the present invention, the valve has a valve housing which can be configured to form a valve seat, and a valve ball accommodated in the valve housing and urged by coolant in the valve housing to snugly fit against the valve seat. Advantageously, the valve seat can be formed by a narrowing of the valve housing to establish a diameter which is smaller than a diameter of the valve ball. During normal operation, the valve ball is urged by the coolant in the hollow valve housing against the valve seat to cut the fluid communication between the secondary vent line and the third vent line. In the event, air bubbles rise from the secondary vent line into the valve housing, the valve ball is caused to sink momentarily to briefly establish a fluid communication between the secondary vent line and the third vent line. In this situation, the third vent line is thus shared by the primary vent line and the secondary vent line.

According to another advantageous feature of the present invention, the secondary vent line can be connected to the valve geodetically below the valve seat, and the primary and third vent lines can be connected to the valve geodetically above the valve seat.

According to another advantageous feature of the present invention, the valve ball may have a density which is smaller than a density of the coolant. As a result of buoyancy, the valve ball floating on the coolant is urged against the valve seat. In the event, air bubbles migrate below the valve ball, the density of the developing coolant-air mixture decreases momentarily so that the valve ball moves away from the valve seat and the air bubbles can pass the valve seat in the direction of the shared third vent line.

According to another advantageous feature of the present invention, the valve can form a geodetically highest point of the secondary vent line. This ensures that rising air bubbles can collect in the valve housing.

According to another aspect of the present invention, a coolant circuit for an internal combustion engine includes plural subcircuits, a compensating reservoir arranged at a geodetically highest point in the coolant circuit, and a valve arrangement for venting the coolant circuit, the valve arrangement including a valve, a primary vent line in fluid communication with the valve and extending from one of the subcircuits, at least one secondary vent line in fluid communication with the valve and extending from another one of the subcircuits, and a third vent line connected to the compensating reservoir, with the valve being constructed to establish a continuous fluid communication of the primary vent line with the compensating reservoir via the third vent line and to establish a fluid communication of the secondary vent line with the compensating reservoir via the third vent line only in the presence of air bubbles in the secondary vent line.

According to another advantageous feature of the present invention, a first one of the subcircuits can be constructed to include a cylinder crankcase of the internal combustion engine, and a second one of the subcircuits can be constructed to include at least one cylinder head of the internal combustion engine, with the first and second subcircuits being circulated by coolant independently from one another.

According to another advantageous feature of the present invention, the first subcircuit and the second subcircuit extend in parallel relationship. Appropriate adjusting and/or shut-off valves can be used to circulate coolant through the subcircuits independently from one another. Any suitable coolant pump may be used for coolant circulation.

According to another advantageous feature of the present invention, the primary vent line can extend from the second one of the subcircuits, and the secondary vent line can extend from the first one of the subcircuits. As a result, the at least one cylinder head incorporated in the second subcircuit is permanently fluidly connected to the compensating reservoir via the primary vent line, while the cylinder crankcase incorporated in the first subcircuit fluidly communicates with the compensating reservoir only in the presence of air bubbles.

According to another advantageous feature of the present invention, a main heat exchanger can be arranged in the first subcircuit and/or second subcircuit, wherein the compensating reservoir can have a drain upstream of the main heat exchanger. The provision of the main heat exchanger permits a recooling of coolant heated by waste heat of the internal combustion engine. The coolant stored in the compensating reservoir is able to return via the drain to the coolant circuit intended for cooling the internal combustion engine by connecting the drain to the heat exchanger upstream of the heat exchanger.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
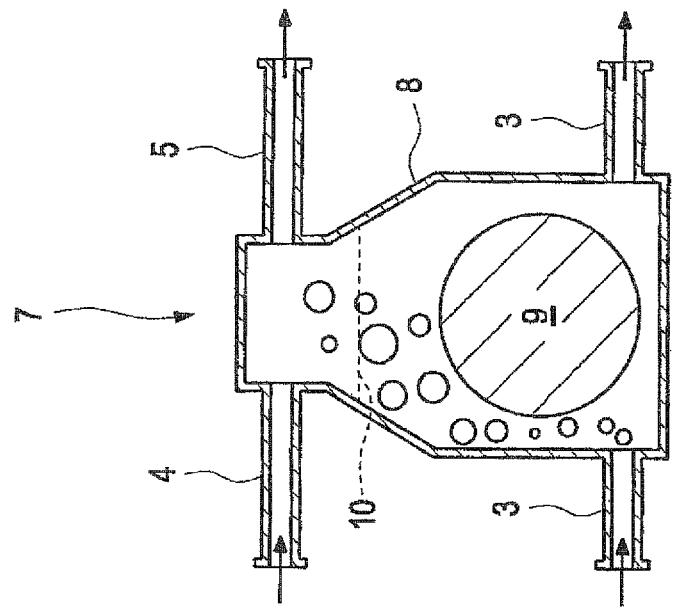
FIG. 1 is a sectional view of a valve arrangement according to the present invention in one operating position.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a sectional view of a valve arrangement according to the present invention for venting a coolant circuit of an internal combustion engine. The valve arrangement includes a valve, generally designated by reference numeral 7 and having a hollow valve housing 8 which is formed with a constriction in the shape of a conical funnel to define a valve seat 10 and normally filled with coolant. A valve ball 9 which is able to float upon the coolant is urged as a result of buoyancy by the coolant in the valve housing 8 to snugly fit against the valve seat 8 during normal operation. This operating position is shown in FIG. 1.

Figure 2:
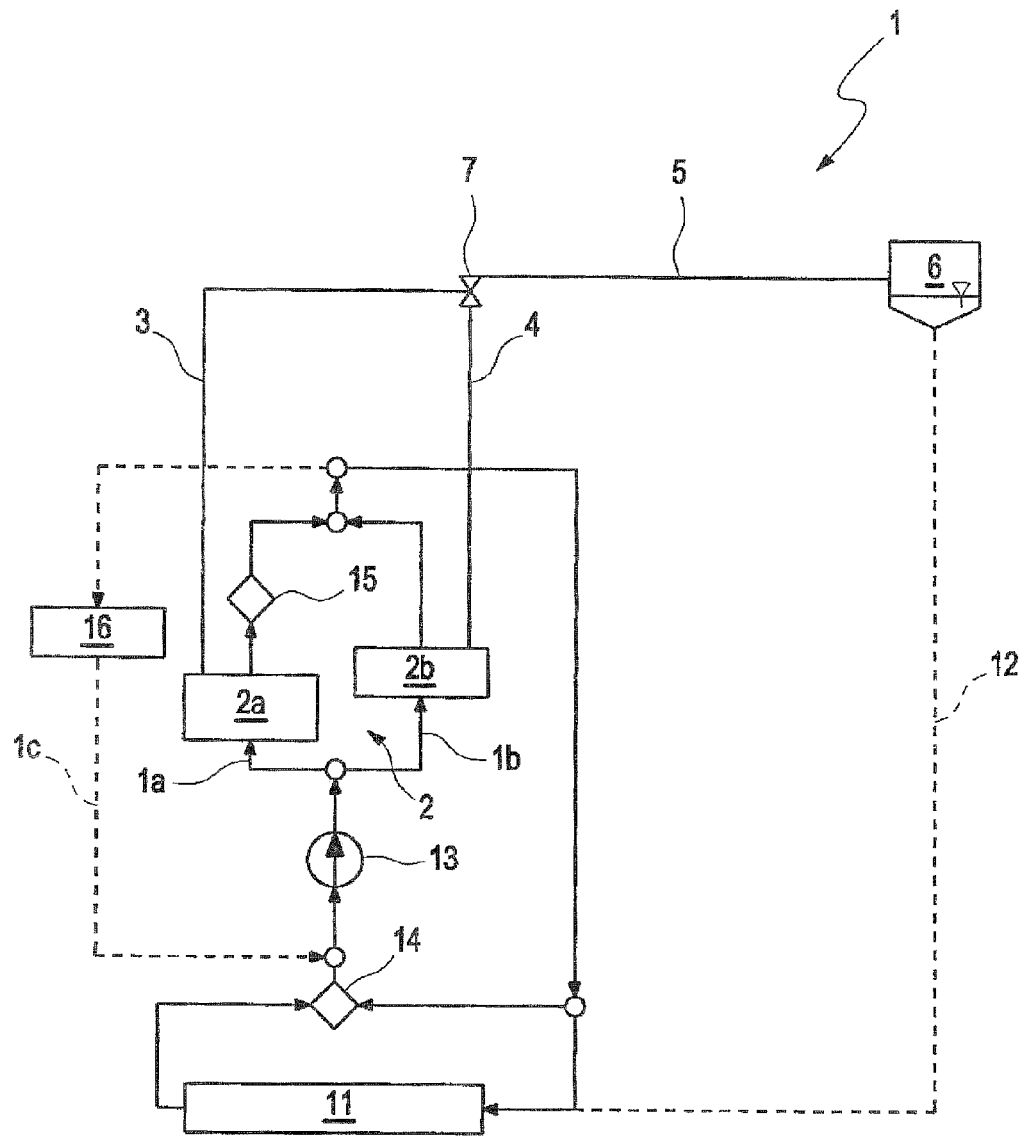
FIG. 2 is a schematic illustration of a coolant circuit having incorporated therein a valve arrangement according to the invention for venting.

Coolant is fed into the valve housing 8 via a primary vent line 4 and a secondary vent line 3 and can be discharged via a shared third vent line 5 to a compensating reservoir 6, shown in FIG. 2. Coolant supplied via the secondary vent line 3 may also be drained via this same secondary vent line 3 to establish a coolant circuit. It is, of course, also conceivable to end the secondary vent line 3 at the valve 7.

Figure 1A:
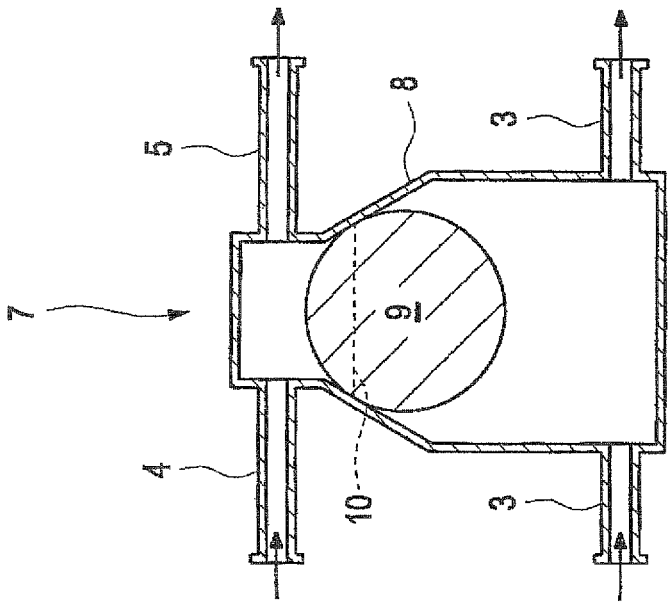
FIG. 1a is a sectional view of the valve arrangement in another operating position.

The primary vent line 4 and the shared third vent line 5 are arranged geodetically above the valve seat 10 whereas the secondary vent line 3 is arranged geodetically below the valve seat 10. Coolant flowing from the primary vent line 4 into the valve housing 8 is thus able to flow into the third vent line 5 regardless of the position of the valve ball 9 in the valve housing 8. Coolant flowing from the secondary vent line 3 into the valve housing 8 is able to flow into the third vent line 5 only when air bubbles from the secondary vent line 3 bubble up and rise within the valve housing 8 to cause the valve ball 9 to sink and thereby detach from the valve seat 10. This operating position is shown in FIG. 1a. When the coolant below the valve ball 9 is free of air bubbles, the valve ball 9 is again urged by the coolant through buoyancy against the valve seat 10, as shown in FIG. 1, thereby cutting the communication between the secondary vent line 3 and the third vent line 5, i.e. no coolant is able to flow from the secondary vent line 3 to the third vent line 5.

FIG. 2 shows a schematic illustration of a coolant circuit, generally designated by reference numeral 1, for an internal combustion engine 2. Parts corresponding with those in FIG. 1 are denoted by identical reference numerals and not explained again. The coolant circuit 1 includes the valve arrangement, shown in FIG. 1. The internal combustion engine 2 is shown here schematically by way of example with a cylinder crankcase 2a and at least one cylinder head 2b. The cylinder crankcase 2a is incorporated in a first subcircuit 1a of the coolant circuit 1. The first subcircuit 1a branches off a second subcircuit 1b of the coolant circuit 1, with the at least one cylinder head 2b being incorporated in the second subcircuit 1b. The first and second subcircuits 1a, 1b extend in substantial parallel relationship. The first subcircuit 1a can be selectively opened and closed by a shut-off valve 15 which is arranged downstream of the cylinder crankcase 2a. A main heat exchanger 16 is arranged in a further subcircuit 1c for maintaining an interior space of a (not shown) motor vehicle at a moderate temperature. A coolant pump 13 is arranged upstream of the internal combustion engine 2 to force coolant to flow through the subcircuits 1a, 1b, 1c. Depending on the operation of a control valve 14, coolant exiting the first subcircuit 1a and the second subcircuit 1b can be cooled in a main heat exchanger 11 or can be routed to a bypass line to circumvent the main heat exchanger 11.

The secondary vent line 3 extends from the cylinder crankcase 2a to the valve 7, whereas the primary vent line 4 leads from the cylinder head 2b to the valve 7. The valve 7 is connected via the third vent line 5 to the compensating reservoir 6 which is positioned at the geodetically highest location in the coolant circuit 1. The valve 7 defines hereby the geodetically highest location of the secondary vent line 3. A drain 12 leads from the compensating reservoir 6 back again to the second subcircuit 1b upstream of the main heat exchanger 11. As a result of the configuration of the valve 7, the primary vent line 4 is in permanent fluid communication with the compensating reservoir, while the secondary vent line 3 fluidly communicates with the compensating reservoir 6 only temporarily so long as air bubbles rise from the secondary vent line 3.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A valve arrangement for venting a coolant circuit of an internal combustion engine having several subcircuits, said valve arrangement comprising:
   a valve;
   a primary vent line in fluid communication with the valve and extending from one of the subcircuits;
   at least a secondary vent line in fluid communication with the valve and extending from another one of the subcircuits; and
   a shared third vent line connected to a compensating reservoir which is arranged at a geodetically highest point in the coolant circuit,
   said valve being constructed to establish a continuous fluid communication of the primary vent line with the compensating reservoir via the third vent line and to establish a fluid communication of the secondary vent line with the compensating reservoir via the third vent line only in the presence of air bubbles in the secondary vent line.

2. The valve arrangement of claim 1, wherein the valve has a valve housing configured to form a valve seat, and a valve ball accommodated in the valve housing and urged by coolant in the valve housing to snugly fit against the valve seat.

3. The valve arrangement of claim 2, wherein the valve housing has a narrowing housing part to define the valve seat of a diameter which is smaller than a diameter of the valve ball.

4. The valve arrangement of claim 2, wherein the secondary vent line is connected to the valve geodetically below the valve seat, and the primary and third vent lines are connected to the valve geodetically above the valve seat.

5. The valve arrangement of claim 2, wherein the valve ball has a density which is smaller than a density of the coolant.

6. The valve arrangement of claim 1, wherein the valve forms a geodetically highest point of the secondary vent line.

7. A coolant circuit for an internal combustion engine, comprising:
   plural subcircuits;
   a compensating reservoir arranged at a geodetically highest point in the coolant circuit; and
   a valve arrangement for venting the coolant circuit, said valve arrangement comprising a valve, a primary vent line in fluid communication with the valve and extending from one of the subcircuits, at least one secondary vent line in fluid communication with the valve and extending from another one of the subcircuits, and a third vent line connected to the compensating reservoir, wherein the valve is constructed to establish a continuous fluid communication of the primary vent line with the compensating reservoir via the third vent line and to establish a fluid communication of the secondary vent line with the compensating reservoir via the third vent line only in the presence of air bubbles in the secondary vent line.

8. The coolant circuit of claim 7, wherein the first subcircuit and the second subcircuit extend in parallel relationship.

9. The coolant circuit of claim 7, wherein a first one of the subcircuits is constructed to include a cylinder crankcase of the internal combustion engine, and a second one of the subcircuits is constructed to include at least one cylinder head of the internal combustion engine, with the first and second subcircuits being circulated by coolant independently from one another.

10. The coolant circuit of claim 8, wherein the primary vent line extends from the second one of the subcircuits, and the secondary vent line extends from the first one of the subcircuits.

11. The coolant circuit of claim 8, further comprising a main heat exchanger arranged in at least one of the first and second subcircuits, wherein the compensating reservoir has a drain upstream of the main heat exchanger.

* * * * *